Jan. 6, 1948.                    C. J. ESSELING                    2,434,104
                                   ROTARY DRILL
                                 Filed June 5, 1946
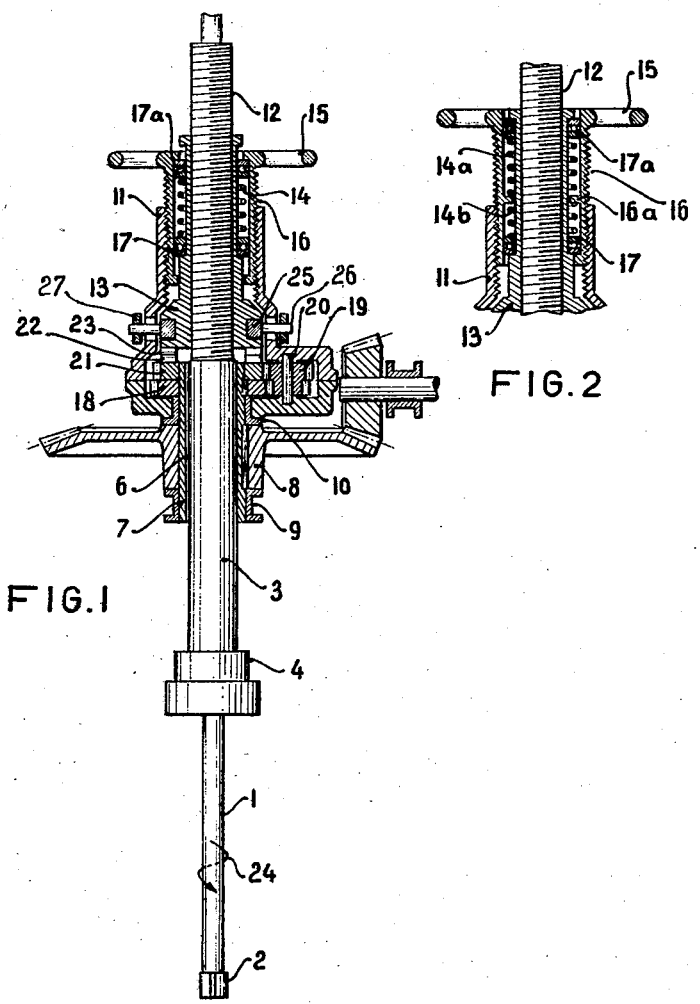
Inventor
Cornelis J. Esseling
by Stevens, Davis & Miller
his attorneys Patented Jan. 6, 1948

2,434,104

UNITED STATES PATENT OFFICE 2,434,104

ROTARY DRILL

Cornelis J. Esseling, Haarlem, Netherlands, assignor to Werf Conrad En Stork Hijsch N. V. Haarlem, Netherlands, a company of the Netherlands Application June 5, 1946, Serial No. 674,431
In the Netherlands February 20, 1942

Section 1, Public Law 690, August 8, 1946
Patent expires February 20, 1962

1 Claim. (Cl. 77—32)

This invention relates to drills of the type comprising in addition to a bit secured, through a line of drill rod, to a threaded rotary grief stem engaged by a nut adapted to be rotated by the stem at a speed differing from that of the stem so that the stem is automatically screwed upward when the nut is arrested, a clutch provided in the transmission gear between the stem and the nut and adapted under the influence of the descending stem automatically to be connected so as to turn the nut in accordance with the descending motion of the stem. In a known machine of this type, the nut is provided with an abutment for a spring, which encircles the stem and bears with its upper end against an abutment of a tensioning member, such as a handwheel, whose threaded hub is adapted to be screwed up and down in the stationary casing of nut and clutch.

This known construction is suitable for apparatus for drilling holes of comparatively small depths, since the nut and, consequently, the line of drill rod secured to the stem, is permanently loaded by the spring and cannot, as is desired with a view to ensuring uniform pressure on the bit in the drilling of relatively deep holes, be relieved from pressure at a rate proportionate to the increase of the length of the line of drill rod.

The present invention provides means for improving this known device in such manner that for said spring and tensioning member also serve for reducing the pressure on the bit as the drilling of the hole proceeds. In accordance with the invention, the nut is also provided with an abutment for the upper end, and the tensioning member is also provided with an abutment for the lower end of the spring, or of part thereof. If, in a device embodying this improvement, the tensioning member has been screwed down through a sufficient distance, the lower end of the spring exerts downward pressure on the nut and the upper end thereof exerts upward pressure on an abutment of the tensioning member, i. e. the nut is loaded at a rate determined by the position of said member.

If, however, the tensioning member is screwed up, the upper end of the tensioned spring engages the upper abutment of the nut, the lower end thereof engaging an abutment of the tensioning member, so that the nut is relieved from pressure. In an intermediate position of the tensioning member, the nut is neither loaded nor unloaded, i. e. the pressure on the bit is determined exclusively by the weight of the line of drill rod and of the parts secured thereto.

In order that the invention may be more fully understood, reference is had to the annexed drawing, in which:

Fig. 1 is a vertical sectional view of a device in accordance with the invention and provided with one spring, and Fig. 2 is a similar view of the top portion of a device comprising two springs.

In the drawing, 1 is the drilling rod, 2 is the bit, 3 is the grief stem and 4 is the drilling head. Stem 3 has a longitudinal groove cooperating with a key 6 in a sleeve 7, so as to have freedom of vertical movement in said sleeve but to be prevented from rotation relative thereto. Secured to sleeve 7 is a mitre wheel 8, by means of which it can be rotated in bearings 9 and 10 of the stationary casing 11.

The stem 3 has a threaded top portion 12 cooperating with a nut 13, which can be urged downward by a coiled spring 14 encircling stem 3 and adapted to be tensioned by a handwheel 15, whose hub 16 is in threaded engagement with casing 11.

Also secured to sleeve 7 is a gear wheel 18 meshing with a stepped pinion 19, which is rotatably mounted about a pivot 20 of casing 11 and meshes with a second gear wheel 21, which is loosely mounted on sleeve 7 and whose diameter is slightly smaller than that of gear 18. Gear wheel 21 is provided on its top face with a friction ring 22 cooperating with a friction ring 23 secured to the bottom face of nut 13.

Countersunk in nut 13 is a slip ring 25 having two diametrically opposed studs 26 engaged by the bifurcated end 27 of a pivotally mounted, weighted hand lever (not shown), by means of which a conical face of nut 13 can be raised into engagement with a mating face of casing 11.

If bit 2 turns in counterclockwise direction as indicated by arrow 24, screw 12 should be right-handed. Rotation of stem 3 is transmitted, through sleeve 7, gear wheel 18 and pinion 19, to gear wheel 21 which thus rotates at a slightly greater angular speed than stem 3. As long as the clutch constituted by the friction rings 22 and 23 is disconnected, nut 13 will rotate at the same speed as stem 3, since the frictional resistance of thread 12 exceeds that of ball bearing 17. When, however, bit 2, together with stem 3 and nut 13, has sunk through a small distance, the said rings exert sufficient pressure on one another to cause nut 13 to follow the rotation of gear 21 i. e. to rotate at a speed slightly exceeding that of stem 3, so that it is screwed up and spring 14 again exerts its full pressure on the stem, until the clutch, owing to a further descending motion of the stem, is again thrown in, et cetera. If the weighted hand lever referred to hereinbefore, nut 13 engages the casing 11, whereby it is braked and prevented from further rotation, the consequence being that the stem, which continuing to rotate, screws itself up.

The device so far described is not essentially different from known constructions. Its novel feature resides in the manner wherein spring 14 cooperates with nut 13 and handwheel 15. As illustrated, said spring is confined between the upper and the lower race, respectively, of two ball bearings 17 and 17a, which are axially slidable with their inner cylindrical faces on the outer wall of a reduced portion of nut 13, and with their outer cylindrical faces on the inner wall of a turned out portion of hub 16, it being understood that the shoulders confining said reduced and turned out portions constitute the abutments referred to hereinbefore.

If handwheel 15 assumes a low position, ball bearing 17 engages the bottom abutment of nut 13 and the top abutment of the handwheel engages ball bearing 17a, so that tensioned spring 14 exerts pressure on nut 13. This pressure may be increased by handwheel 15 being screwed still further down. If the handwheel is screwed upward through a certain distance, the ball bearing 17a will engage the upper abutment of nut 13, while ball bearing 17 still engages the lower abutment of said nut, and under these conditions the spring load in the nut is nil. Further upward movement of the handwheel will cause ball bearing 17 to disengage the lower abutment of the nut, the consequence being that the spring, through the ball bearing 17a, exerts an upwardly directed pressure on the nut, whereby the bit 2 is relieved from pressure.

Fig. 2 shows a second embodiment of the invention. In accordance with this figure, the spring member is constituted by two aligned coiled springs 14a, 14b, and the two abutments of the handwheel (viz. that for the bottom end of spring 14a and that for the top end of the spring 14b) are formed by the top face and the bottom face, respectively, of a circular shoulder 16a on the inner wall of hub 16.

What I claim is:

A rotary drill conprising, in addition to a bit secured to a threaded rotary stem engaged by a nut adapted to be rotated by the stem at a speed differing from that of the stem so that the stem is automatically screwed upward when the nut is arrested, a clutch in the transmission gear between stem and nut and adapted under the influence of the descending stem automatically to be thrown in to turn the nut in accordance with the descending motion of the stem, and a spring member encircling the stem and bearing with its bottom end against an abutment of the nut, said spring member bearing with its top end against an abutment of a tensioning member having a threaded hub adapted to be screwed up and down in a stationary casing accommodating the nut and the clutch, wherein the nut is also provided with an abutment for the top end, and the tensioning member is also provided with an abutment for the bottom end of the spring member, or of part of said spring member.

CORNELIS J. ESSELING.